United States Patent [19]

Wanlass

[11] 4,095,149

[45] June 13, 1978

[54] OPTIMIZED ELECTRIC MOTOR HAVING CONTROLLED MAGNETIC FLUX DENSITY

[76] Inventor: Cravens L. Wanlass, 9871 Overhill Dr., Santa Ana, Calif. 92705

[21] Appl. No.: 674,406

[22] Filed: Apr. 7, 1976

[51] Int. Cl.² ............................................. H02P 1/44
[52] U.S. Cl. ............................... 318/220 A; 318/222; 318/228
[58] Field of Search ........... 318/220 R, 220 A, 221 R, 318/222, 225, 228, 229

[56] References Cited
U.S. PATENT DOCUMENTS

| | | | |
|---|---|---|---|
| 2,427,920 | 9/1947 | Morrison | 318/220 R |
| 2,991,402 | 7/1961 | Imada et al. | 318/220 R |
| 3,389,315 | 6/1968 | Andreas et al. | 318/221 R |
| 3,584,277 | 6/1971 | Teodorescu | 318/222 |
| 3,675,100 | 7/1972 | McNamara et al. | 318/220 R |

*Primary Examiner*—Gene Z. Rubinson
*Attorney, Agent, or Firm*—Lyon & Lyon

[57] ABSTRACT

A motor is disclosed in which a control winding is provided to generate magnetic flux in the stator to vary the volt-second capacity of the magnetic material of the stator in accordance with varying line, load or other selected conditions. The current in the control winding can be externally controlled or may be provided by a feedback winding wound on the stator.

21 Claims, 5 Drawing Figures

OPTIMIZED ELECTRIC MOTOR HAVING CONTROLLED MAGNETIC FLUX DENSITY

RELATED APPLICATIONS

The subject matter of this application relates to the subject matter of my application Ser. No. 597,529 filed July 21, 1975 entitled "Electric Motor Having Controlled Magnetic Flux Density", now U.S. Pat. No. 4,063,135 the disclosure of which is incorporated by reference herein.

BRIEF SUMMARY OF THE INVENTION

In my aforementioned copending application, there is disclosed an electric motor which is significantly more efficient than those currently available. Briefly, that motor operates by providing a system in which the magnetic flux density in the stator is maintained at a maximum level while the current in the rotor is also maintained at a large magnitude under full load conditions. The flux density in the stator is controlled by means of a capacitor coupled in series with the main stator winding, the capacitor having a value such that the voltage stored therein will, in combination with the input voltage, periodically cause the volt-second capacity of the stator core to be exceeded with the result that the core will periodically change non-linearly from a non-saturated to a saturated condition and back again. The capacitor acts to limit the amount of energy that can be transferred to the rotor even when the rotor has a very low impedance with the result that rotor current can also be maximized. An auxiliary winding is preferably connected in parallel with the main winding and the capacitor to provide the necessary rotating fields for starting a single phase motor and in addition provides considerably more starting torque for the motor.

While that motor has been found to be extremely satisfactory, I have discovered that even greater operating efficiencies can be obtained by effectively varying the amount of magnetic material available to the main motor winding in accordance with the line, load or other selected conditions. By varying the amount of magnetic material that is effectively available, stator magnetic losses and stator copper losses, which make up a significant and uncontrollable portion of the total losses of a conventional motor, can be made to vary with the demands on the motor. In other words, if the motor according to the present invention is operating at no load, the amount of magnetic material effectively available is made rather small so that the stator magnetic losses and stator copper losses are quite low. The magnetic material effectively available, however, is sufficient to produce enough power to drive the motor at no load. When the motor is loaded, the amount of magnetic material available is increased to a point sufficient to still provide sufficient power. Of course, the internal losses of the motor increase during this loading period but still might be less than would be the case if the motor was under full load. Because the losses are made to vary with the load on the motor, and because a motor is rarely operated under full load over its entire operating period, the average internal losses are significantly decreased and the efficiency increased. The result is a motor which is completely satisfactory under any load condition, but which consumes considerably less electrical energy than conventional motors which have essentially the same losses whether they are operating at no load or full load.

Control of the amount of magnetic material effectively available in the motor of the present invention is accomplished by providing the stator with a control winding which, when energized, causes the stator core to be partially saturated, thus effectively reducing the magnetic cross-sectional area of the stator core. This reduction in magnetic cross-sectional area reduces the volt-second capacity of the core with the result that the voltage across the motor is also reduced. This results in the voltage across the capacitor being also reduced since the current must at all times be such that all voltages around the loop must add up to zero. The reduction in capacitor voltage results in a corresponding reduction in the stored energy in the capacitor because of the equation:

$$E = \tfrac{1}{2} CV^2$$

Where $E$ = energy stored;
Where $C$ = capacitance; and
Where $V$ = the capacitor voltage.

The energy now circulated in the motor during each half cycle is greatly reduced and the motor losses are correspondingly reduced.

By making the current in the control winding a function of a motor condition, for example, load, the motor can be made to operate at a very efficient point for all load conditions. Thus, if the motor is not loaded, the control current can be made to be high with the result that the effective cross-sectional area of the core is small so that the circulating energy, and the corresponding losses, are also small. As the load increases, the control current can be made to decrease with the result that the power handling capacity of the motor increases to whatever level is necessary to drive the increased load. The control current, of course, can be made responsive to other motor conditions such as line voltage or speed, or any desired combination of motor conditions or other desired external conditions.

It is therefore an object of the present invention to provide an electrical motor which operates very efficiently.

It is another object of the present invention to provide an electrical motor in which the power transferred, and consequently the internal losses, are made to vary in response to the demands made upon the motor.

DESCRIPTION OF THE INVENTION

Figure 1:
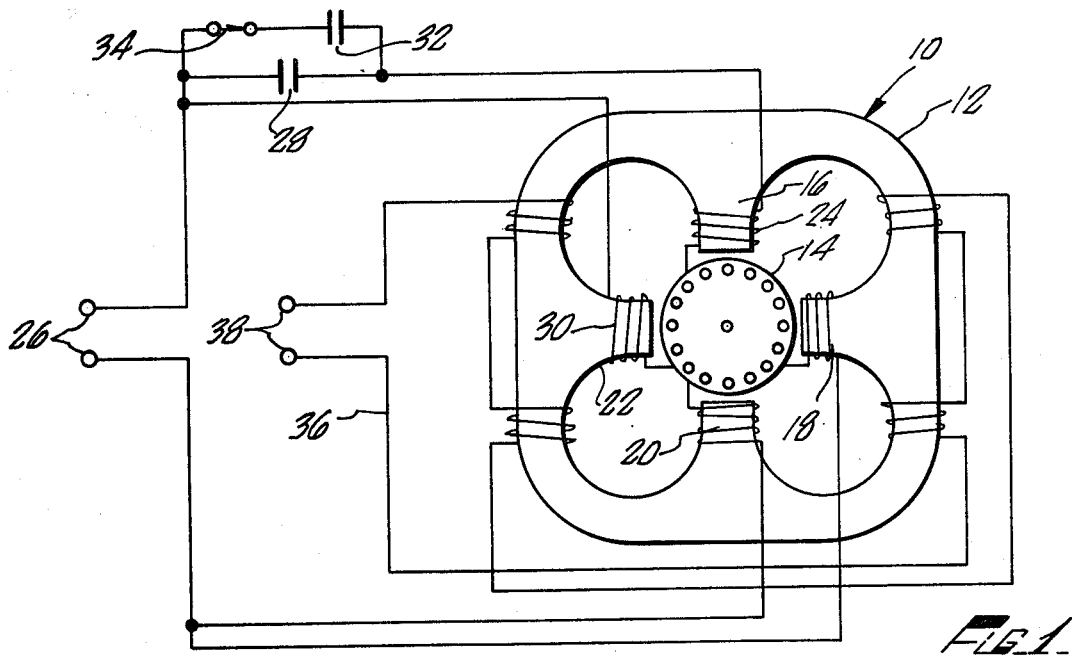
FIG. 1 is a schematic diagram of a simplified version of the present invention.

FIG. 1 illustrates in schematic form a simplified embodiment of the present invention. An AC induction motor of the squirrel cage type is generally indicated at 10 and is diagrammatically shown to have a stator 12 of magnetic material and a squirrel cage rotor 14. The stator is shown as having four pole pieces, 16, 18, 20 and 22 although more or less pole pieces may be used if desired, as will be apparent to those skilled in the art. It will also be apparent to those skilled in the art that the configuration of the pole pieces shown is diagrammatic only. It should be understood that no attempt is made herein to optimize the physical construction of the motor.

The main stator winding 24 is shown as wound on poles 16 and 20 and is connected to input terminals 26 by means of a series capacitor 28. The capacitor need have no particular value, but its capacitance must be large enough to maintain a capacitive power factor in the series circuit comprising this capacitor and the winding 24 during the motor's normal operating mode. An auxiliary winding 30 is wound on pole pieces 18 and 22 and is connected in parallel with winding 24 and capacitor 28. The winding 30 is preferably of considerably higher inductance and impedance than the winding 24. It may, for example, have considerably more turns of finer wire. A starting capacitor 32 is connected across the capacitor 28 by a centrifugal switch 34.

A control winding 36 is wound on the stator core and may be connected to a source of control current through terminals 38. As can be seen, the control winding 36 is wound on the stator core 12 so that the flux generated by the motor windings balance out from an AC flux standpoint and no AC voltage is induced in the control winding 36. It should be understood that the positioning of the coils of the winding 36 as shown in FIG. 1 is diagrammatic only and any suitable winding technique could be used in practice.

The basic mode of operation of the motor of FIG. 1 is described in my aforementioned application. Briefly, when an AC voltage is applied to the terminals 26, the capacitor 28 begins to charge and a current flows through the winding 24. A current also flows through winding 30 which is out of phase with the primarily capacitive current in the winding 24 with the result that a rotating field is created which causes the rotor 14 to begin rotating. At this time, a substantial amount of the driving force is produced by the winding 30 inasmuch as the main winding 24 and capacitor 28 have not yet entered into their normal operating mode. As the rotor speed and the back EMF increase, the effective inductance of the winding 24 becomes such that this winding 24, together with the capacitor 28, goes into its operating mode. In other words, the effective volt-second capacity of the winding 24 and its associated magnetic material becomes sufficiently large to permit the operation of the device its operating mode, i.e., the capacitor 28 will periodically charge, discharge and recharge in the opposite direction causing the magnetic material associated with the winding 24 to switch from a non-saturated to a saturated condition while maintaining the average flux density quite large.

The winding 36 is used to control the effective cross-sectional area of the magnetic material associated with the winding 24, and hence to control the volt-second capacity of this magnetic material. As can be readily seen, when a relatively large direct current is introduced into the winding 36 through the terminals 38 a relatively large magnetic flux will be generated in the core 12. This flux has the same effect as if the amount of magnetic material in the core 12 was physically reduced, i.e., the volt-second capacity of the material is reduced as is the inductance of the winding 24 and the amount of energy that can be stored therein. In effect, the hysteresis loop of the core 12 is tipped over and its area decreased with the result that the inductance of the winding 24 is decreased. The voltage across the capacitor 28 automatically adjusts to compensate for the lower voltage across the now reduced inductance of the winding 24. This occurs because the sum of the input voltage plus the voltage across the winding 24 plus the voltage across the capacitor 28 plus the voltage drop across the accumulated resistance in the circuit must equal zero. Consequently, when the voltage across the winding 24 drops, the voltage across the capacitor 28 must experience a corresponding decrease to keep the loop sum at zero. The capacitor, of course, also serves to limit the current flow and prevents the winding 24 from burning out. The lower voltages in the capacitor and inductor means that less energy is circulated in the system with the result that a lower current flows. Consequently the stator copper losses are reduced.

The energy that can be transferred by the motor operating with a high control current is, of course, quite sufficient to drive the motor at no load. The losses in the motor will be at an absolute minimum in this operating condition. When it is necessary for the motor to drive a load, the current in the control winding 36 may be reduced thereby increasing the effective cross-sectional area of the magnetic material of the core 12, increasing its volt-second capacity, and increasing the energy transfer capability of the motor. Internal losses will also increase, but these increased losses will prevail only during the time that the effective size of the motor is increased to cope with the increased demand. The average losses of the motor are obviously considerably lower than the losses of a conventional motor which must be designed to have maximum capacity even at no load with the result that it also has almost maximum losses at this point.

A control current can be provided to the terminals 38 in any number of ways as will be apparent to one skilled in the art. The remaining figures of the drawing illustrate various ways in which this can be accomplished although it will be obvious to those skilled in the art that many other approaches are equally satisfactory.

Figure 2:
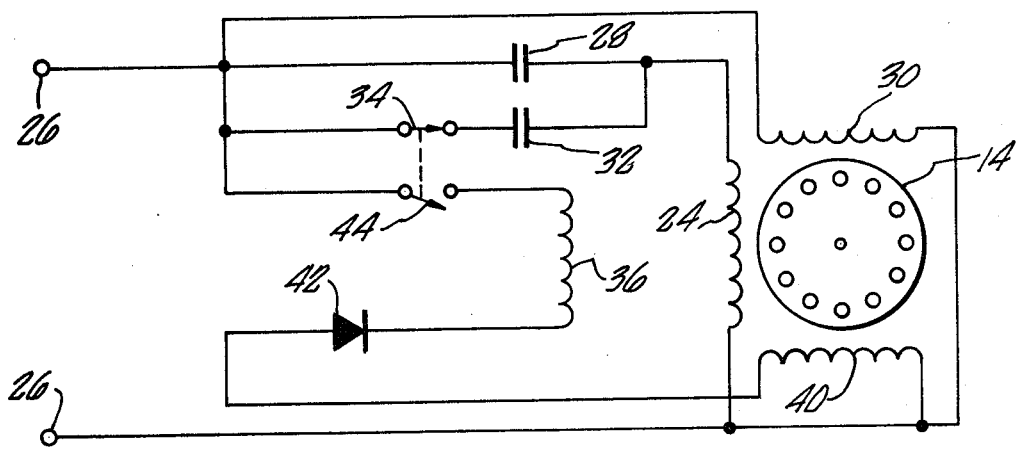
FIG. 2 is a schematic diagram of another embodiment of the present invention.

FIG. 2 illustrates one of the simplest and most effective ways of providing a control current to the winding 36. In this figure, the same reference numerals are used to designate the same elements as those shown in FIG. 1. A feedback winding 40 has been added to the stator core to generate a voltage proportional to the back EMF generated by the motor. The feedback winding 40 is connected to the control winding 36 by a diode 42 and this entire circuit is connected across the input terminals 26 by a switch 44 which is ganged with the centrifugal switch 34. The switch 44 is not necessary but can be useful in delaying the operation of the control circuit until the motor is up to speed after starting. For this reason, the switch 44 is shown in the open position while the switch 34 is shown in the closed position. Once the motor is up to speed, of course, the switch 34 will open and the switch 44 will close.

Assuming that the motor is running at rated speed and no load, the voltage generated in the winding 40 will exceed the input line voltage with the result that on every other half cycle a direct current will flow in the control winding 36 resulting in a DC magnetic flux being generated in the stator core. As pointed out above, this control flux will result in a reduction of the volt-second capacity of the core and a consequent decrease in the internal losses in the motor. Assume now that the motor is partially loaded. As a result, it will tend to slow down and the back EMF will be reduced. This will result in a lower voltage being induced in the winding 40 with the result that the current flowing through the diode 42 and winding 36 will decrease. The resulting decrease in the control flux in the stator core will release more of the core material for the use of the main motor circuit, the volt-second capacity of the core will increase, and the energy transferred by the motor will increase with the result that the load will be driven at the desired speed. As the load is increased to full load, the control current will be reduced to zero with the result that all of the magnetic material of the stator core will be available for use by the main motor circuit.

Because of the wide diversity of motor sizes and designs it is impractical to set forth any particular parameters for the control circuit illustrated in FIG. 2. In general, however, the number of turns on the control winding for any given motor should be such as to provide stable feedback operation without oscillatory conditions, as will be apparent to those skilled in the art.

Figure 3:
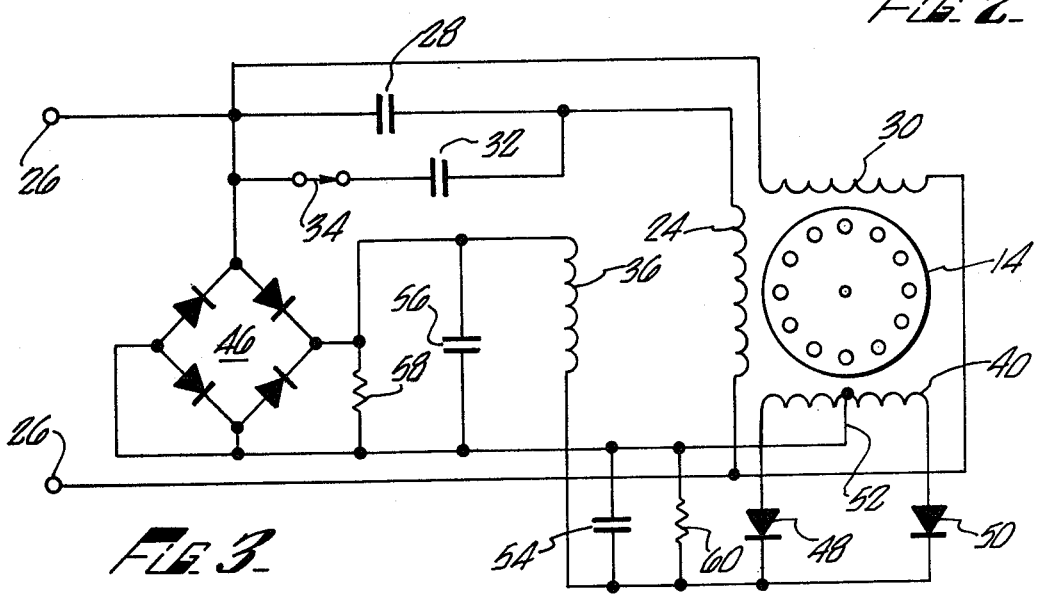
FIG. 3 is a schematic diagram of further embodiment of the present invention.

FIG. 3 shows an embodiment of the present invention in which full wave rectifiers are used so that a smooth DC current is passed through the control winding 36. In this figure, the same reference numerals are used for the same elements shown in FIGS. 1 and 2. A full wave rectifier 46 is connected across the input terminals 26 and provides a voltage which is opposed by the voltage produced by a full wave rectifier coupled to the output of the feedback winding 40, the latter rectifier comprising diodes 48 and 50, and midtap connection 52. If desired, filtering capacitors 54 and 56 can also be used. Resistances 58 and 60 are provided to permit the full wave rectifiers to conduct. As can be seen, if the voltage induced in the winding 40 is equal to the input voltage, no current will flow in control winding 36. If, however, these two voltages do not balance, a current will flow in the control winding 36 with the result that a control flux will be generated in the stator core. This control system would result in the voltage induced in the feedback winding being kept equal with the input voltage regardless of line voltage or load changes. Therefore, if this motor is designed to achieve this balance at full load, any deviation of either the line or the load conditions will cause a control current to flow in the control winding 36 to bring the system back into balance. For example, if the load is removed from the motor, the rotor would speed up, thus increasing the feedback voltage. A current will flow in the control winding, the volt-second capacity of the stator core will be reduced, as will the energy transferred by the system, with the result that internal losses will be reduced in the manner described above. If desired, a diode such as the diode 42 can be provided in the circuit FIG. 3. If the diode is poled in the direction of current flow from the winding 40 to the full wave rectifier 46, the control circuit will respond to changes in load in the same manner as described in connection with FIG. 2. If the diode is poled in the opposite direction, the control circuit will respond to changes in line voltage.

Figure 4:
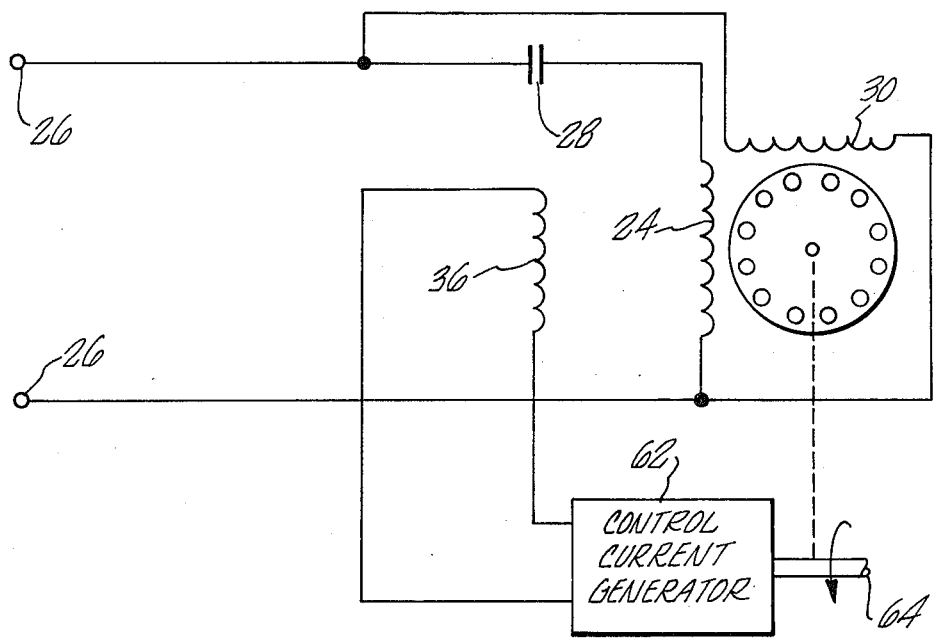
FIG. 4 is a schematic diagram of an additional embodiment of the present invention in which the system is responsive to the RPM of the motor.

FIG. 4 illustrates a modification of the present invention wherein a current is supplied to the control winding 36 by a control current generator 62 energized by a shaft 64 which is driven by the rotor 14. The system is thus responsive to the RPM of the motor the control current generator 62 being designed to generate a current that decreases as the RPM of the motor decreases.

Figure 5:
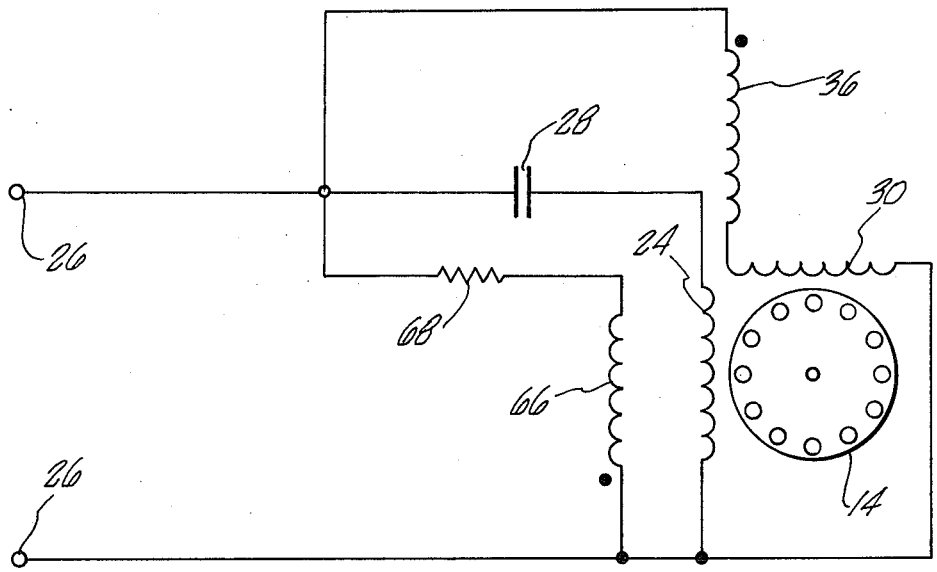
FIG. 5 is a schematic diagram of an embodiment of the present invention in which the system is responsive to changes in line current.

FIG. 5 shows a modification of the present invention that responds to changes in line current. In this embodiment, the control winding 36 is connected in series with the auxiliary winding 30. A second control winding 66, poled in a direction opposite to that of winding 36 is connected across the input terminals 26 by a current limiting resistor 68. The current through the winding 66 generates a first flux component in the stator core while the current through the winding 36 generates a flux component in the opposite direction. The windings are selected so that at no load, the flux component generated by the winding 66 prevails and a substantial AC control flux is present in the stator core with the result that the volt-second capacity of the core is low. As the motor is loaded and begins to slow down more current is drawn by the auxiliary winding 30 with the result that the flux component generated by the winding 36 increases and the net control flux in the core decreases so that more energy can be transferred. As the load on the motor reaches its rated value, the flux components generated by the windings 66 and 36 become equal, so that the motor attains its maximum energy transfer condition.

It will be clear from the foregoing description that any desired method of deriving the control current from any desired source may be used in connection with the present invention. While a single phase motor has been illustrated and described, it should be understood that the present invention can equally well be used in connection with three phase or other multi-phase motors. It should also be understood that although the invention has been described in connection with a squirrel cage induction motor, it is not limited thereto. It should further be understood that the control current need not be direct current but could be alternating current, or could be controlled by pulse width modulation, etc. The circuits shown and described are thus illustrative only and are not intended to be in any way limiting on the broad concept of the present invention.

I claim:
1. An electric motor comprising:
   a stator core including a plurality of poles and magnetic material joining said poles;
   a rotor;
   main stator winding means wound on said core and encompassing the magnetic material to generated magnetic flux which links said rotor;
   an input adapted to be connected to a source of AC voltage;
   capacitor means;
   means connecting the main stator winding means and said capacitor means in a series circuit across said input; and
   means for introducing a control magnetic flux into said joining magnetic material to vary the amount of magnetic material effectively encompassed by said main stator winding without substantially linking said rotor with said control flux.

2. The motor of claim 1 wherein said means for introducing a control flux comprises a control winding wound on said stator encompassing said magnetic material, and means for supplying a control current to said control winding.

3. The motor of claim 2 wherein a second control winding is wound on said stator encompassing said magnetic material, said second control winding introducing a control flux component in a direction opposed to the control flux component introduced by the other control winding.

4. An electric motor comprising:

a stator including magnetic material;
a rotor;
a main stator winding encompassing the magnetic material;
an input adapted to be connected to a source of AC voltage;
capacitor means;
means connecting the main stator winding and the capacitor means in a series circuit across said input;
a control winding wound on said stator for introducing a control flux into said magnetic material to vary the amount of magnetic material effectively encompassed by said main stator winding;
means for supplying a control current to said control winding;
means for generating a voltage proportional to the back EMF of the motor; and
means coupling said generating means to said control current supplying means.

5. The motor of claim 4 wherein said generating means comprises a further winding wound on said stator.

6. An electric motor comprising:
a stator including magnetic material;
a main stator winding of relatively low inductance encompassing the magnetic material;
a control winding encompassing the magnetic material;
a feedback winding encompassing the magnetic material;
an input adapted to be connected to a source of AC voltage;
a capacitor;
means connecting the capacitor and the main stator winding in a series circuit across the input, the capacitor having a capacitance large enough to maintain a capacitative power factor in said series circuit in the operational mode; and
means connecting said feedback winding, said control winding and said input in a circuit whereby a control current is passed through said control winding when said motor is operating at less than rated load.

7. The motor of claim 6 wherein said second mentioned connecting means include rectifier means.

8. The motor of claim 6 further comprising an auxiliary stator winding of relatively higher inductance encompassing the magnetic material, and means connecting the auxiliary winding in parallel with said series circuit.

9. An electrical circuit for energizing and controlling an alternating current electric motor having a stator including a magnetic core, a stator winding wound on the core of said stator, and a rotor, comprising:
an input adapted to be connected to a source of AC voltage;
capacitor means;
means connecting said capacitor means and said stator winding in series across said input;
said capacitor means being capable of being charged to a voltage sufficient, when added to said AC voltage, to develop a volt-second value across said stator core greater than the volt-second capacity of said core so that said core will be driven into saturation in opposite directions on each half cycle of said AC voltage; and
means for varying the volt-second capacity of said core.

10. The motor of claim 9 wherein said means for varying the volt-second capacity of said core comprises a control winding wound on said core, and means for supplying a control current to said control winding.

11. The motor of claim 10 further comprising means for generating a voltage proportional to the back EMF of the motor, and means coupling said generating means to said control current supplying means.

12. The motor of claim 11 wherein said generating means comprises a further winding wound on said stator core.

13. The motor of claim 12 wherein said coupling means includes rectifier means.

14. The motor of claim 11 wherein means are provided for disabling said coupling means until said rotor reaches a predetermined speed.

15. The circuit of claim 10 wherein a third winding is wound on the stator and means are provided for connecting said second winding in parallel with the series connected stator winding and capacitor means.

16. The circuit of claim 15 wherein the third winding has a higher inductance than said first winding.

17. The motor of claim 15 wherein a fourth winding is wound on the stator, said fourth winding being connected in series with said third winding and generating a control flux component in said core in a direction opposed to the control flux component generated by said control winding.

18. An electric motor comprising:
a stator including magnetic material;
a rotor;
a main stator winding encompassing the magnetic material;
an input adapted to be connected to a source of AC voltage;
capacitor means;
means connecting the main stator winding and said capacitor means in a series circuit across said input;
a control winding wound on said stator for introducing a control flux into said magnetic material to vary the amount of magnetic material effectively encompassed by said main stator winding;
means for supplying a control current to said control winding;
means for generating a current responsive to the RPM of the motor; and
means coupling said generating means to said control current supplying means.

19. An electric motor comprising:
a stator including magnetic material;
a rotor;
a main stator winding encompassing the magnetic material;
an input adapted to be connected to a source of AC voltage;
capacitor means;
means connecting the mean stator winding and said capacitor means in a series circuit across said input, said capacitor means having a capacitance large enough to maintain a capacitive power factor in said series circuit in the operating mode, and being capable of storing a voltage sufficient, together with a voltage applied to said input, to cause said magnetic material to periodically change from a non-saturated to a saturated condition; and
means for introducing a control flux into said magnetic material to vary the amount of magnetic material effectively encompassed by said main stator winding.

20. An electric motor comprising:
a stator comprising a core including magnetic material and main and auxiliary stator windings would on said core and encompassing said magnetic material;
a rotor;
capacitor means;
an input adapted to be connected to a source of AC voltage;
means connecting the capacitor means and the main stator winding in series across said input and said auxiliary winding in parallel with said series circuit;
said capacitor means being capable of being charged to a voltage sufficient, when added to an AC voltage applied to said input, to develop a volt-second value across said magnetic material greater than the volt-second capacity of said magnetic material so that said magnetic material will be driven into saturation in opposite directions on each half-cycle of said AC voltage;
said stator windings being arranged and dimensioned such that, upon application of an AC voltage to said input, energy is primarily transferred to said rotor through said auxiliary winding until the back e.m.f. of said motor increases to a point where the volt-second capacity of said magnetic material is sufficiently large to permit primary energy transfer to said rotor through said main winding; and
a control winding wound on said stator core for introducing a control flux into said magnetic material to vary the amount of magnetic material effectively encompassed by said main stator winding and thereby vary the volt-second capacity of said magnetic material.

21. An electric motor comprising:
a stator comprising a core including magnetic material and main and auxiliary stator windings wound on said core and encompassing said magnetic material;
a rotor;
capacitor means;
an input adapted to be connected to a source of AC voltage;
means connecting the capacitor means and the main stator winding in series across said input and said auxiliary winding in parallel with said series circuit;
said capacitor means having a capacitance large enough to maintain a capacitive power factor in said series circuit in the operating mode and being capable of being charged to a voltage sufficient, when added to said AC voltage, to develop a volt-second capacity of said magnetic material so that the said magnetic material will be driven into saturation in opposite directions on each half-cycle of said AC voltage;
said auxiliary winding having a higher inductance than said main winding so that, upon application of an AC voltage to said input, energy is primarily transferred to said rotor through said auxiliary winding until the back e.m.f. of said motor increases to a point where the volt-second capacity of said magnetic material is sufficiently large to permit primary energy transfer to said rotor through said main winding; and
a control winding wound on said stator core for introducing a control flux into said magnetic material to vary the amount of magnetic material effectively encompassed by said main stator winding and thereby vary the volt-second capacity of said magnetic material.

* * * * *